United States Patent
Holt

(10) Patent No.: US 9,677,671 B2
(45) Date of Patent: Jun. 13, 2017

(54) ARMATURE ASSEMBLY FOR A SOLENOID VALVE

(71) Applicant: Pyroban Limited, Shoreham-by-sea, Sussex (GB)

(72) Inventor: Marco Holt, Brighton (GB)

(73) Assignee: Pyroban Limited, West Sussex (GB)

( * ) Notice: Subject to any disclaimer, the term of this patent is extended or adjusted under 35 U.S.C. 154(b) by 31 days.

(21) Appl. No.: 14/435,608

(22) PCT Filed: Oct. 25, 2012

(86) PCT No.: PCT/EP2012/071154
§ 371 (c)(1),
(2) Date: Apr. 14, 2015

(87) PCT Pub. No.: WO2014/063741
PCT Pub. Date: May 1, 2014

(65) Prior Publication Data
US 2015/0354721 A1    Dec. 10, 2015

(51) Int. Cl.
*F16K 1/22* (2006.01)
*F16K 1/226* (2006.01)
(Continued)

(52) U.S. Cl.
CPC .............. *F16K 1/221* (2013.01); *F16K 1/224* (2013.01); *F16K 1/226* (2013.01);
(Continued)

(58) Field of Classification Search
CPC . F16K 1/22; F16K 1/221; F16K 1/224; F16K 1/226; F16K 31/10; F16K 31/105;
(Continued)

(56) References Cited

U.S. PATENT DOCUMENTS 2,867,236 A * 1/1959 Klein .................... F16K 31/082
251/129.1
3,970,282 A    7/1976 Hansen
(Continued)

FOREIGN PATENT DOCUMENTS

CH           526064 A       7/1972
CN         101198773        6/2008
(Continued)

OTHER PUBLICATIONS

European Patent Office, International Search Report in International Patent Application No. PCT/EP2012/071154, Jul. 19, 2013, 3 pp.

Primary Examiner — John K Fristoe, Jr.
Assistant Examiner — Ian Paquette

(57) ABSTRACT

An armature assembly for a solenoid valve allows for a valve member to be retained in the closed position through a biasing force being applied therein. A moveably supported armature bolt is movable between a first position and a second position. A valve member is coupled to the armature bolt and is configured to close with the armature bolt at the second position. An armature body is coupled to the armature bolt. A resilient member adapted to hold the armature bolt at the second position so as to retain the valve member in the closed position.

17 Claims, 4 Drawing Sheets

(51) Int. Cl.
*F16K 31/08* (2006.01)
*F16K 31/06* (2006.01)
*F16K 31/10* (2006.01)

(52) U.S. Cl.
CPC ........ *F16K 31/0682* (2013.01); *F16K 31/082* (2013.01); *F16K 31/105* (2013.01)

(58) Field of Classification Search
CPC ...... F16K 31/06; F16K 31/0682; F16K 31/08; F16K 31/082
USPC .................................................. 251/129.15
See application file for complete search history.

(56) References Cited

U.S. PATENT DOCUMENTS

| | | | |
|---|---|---|---|
| 5,029,807 A | 7/1991 | Fuchs | |
| 5,960,829 A * | 10/1999 | Sigler | B60R 15/04 137/236.1 |
| 6,932,317 B2 | 8/2005 | Gnadinger et al. | |
| 2004/0045539 A1 * | 3/2004 | Furuta | F16K 31/0679 123/529 |
| 2004/0251440 A1 | 12/2004 | Gnadinger et al. | |
| 2007/0006829 A1 * | 1/2007 | Abram | F01N 1/165 123/90.11 |
| 2009/0084998 A1 * | 4/2009 | Callahan | F01N 1/165 251/129.2 |
| 2012/0017552 A1 * | 1/2012 | McAuliffe | B01D 46/0005 55/418 |
| 2013/0020514 A1 * | 1/2013 | Watanabe | B60T 13/36 251/129.15 |

FOREIGN PATENT DOCUMENTS

| | | |
|---|---|---|
| CN | 201103705 | 8/2008 |
| DE | 4306847 A1 | 9/1994 |
| DE | 102006021740 A1 | 11/2007 |
| WO | WO 2007/005424 A1 | 1/2007 |
| WO | WO 2010/029359 A1 | 3/2010 |
| WO | WO 2011/032724 A2 | 3/2011 |

* cited by examiner

ARMATURE ASSEMBLY FOR A SOLENOID VALVE

TECHNICAL FIELD

This disclosure relates to the field of solenoid valves; in particular to field of armature assemblies for solenoid valves.

BACKGROUND

Solenoid valves may generally comprise a solenoid and a movable armature. The armature may be moved through generation of an electromagnetic force by a coil in the solenoid. An armature may move the valve member provided in the solenoid valve. Solenoid valves may be used in fluid control, especially for air or gas control, where an orifice or aperture in a fluid flow path is opened or closed by the valve member.

The valve member may be closed through generation of a high electromagnetic force and retained in the close position through generation of a low electromagnetic force.

US20040251440 discloses a low power solenoid valve. The solenoid valve assembly may comprise a solenoid driver adapted to generate a first voltage level to initiate movement of the magnetized armature, and a second voltage level to hold the magnetized armature in the energized position. The solenoid valve assembly may have a housing, a solenoid, and a magnetized cylindrical armature engagingly coupled to the solenoid and residing within the hollow center of the solenoid. The armature may have a spring affixed to one end of the armature and affixed to the end of the solenoid, wherein the spring and armature are capable of linear motion within the fluid chamber of the valve housing and within the cylindrical plunger guide of the solenoid. The linear motion is controlled by the magnetic field of the solenoid and the spring so as to enable the magnetized armature to abut against the orifice fluid exit of the orifice plate to prevent fluid flow there-through.

The present disclosure is directed, at least in part, to improving or overcoming one or more aspects of the prior art system.

BRIEF SUMMARY OF THE INVENTION

The present disclosure describes an armature assembly for a solenoid valve, the armature assembly comprising: a moveably supported armature bolt, the armature bolt being movable between a first position and a second position; a valve member coupled to the armature bolt, the valve member being configured to close with the armature bolt at the second position; an armature body coupled to the armature bolt; and a resilient member to hold the armature bolt at the second position so as to retain the valve member in the closed position.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to an armature assembly 10. The armature assembly 10 may control flow of fluid in a fluid passage.

Figure 1:
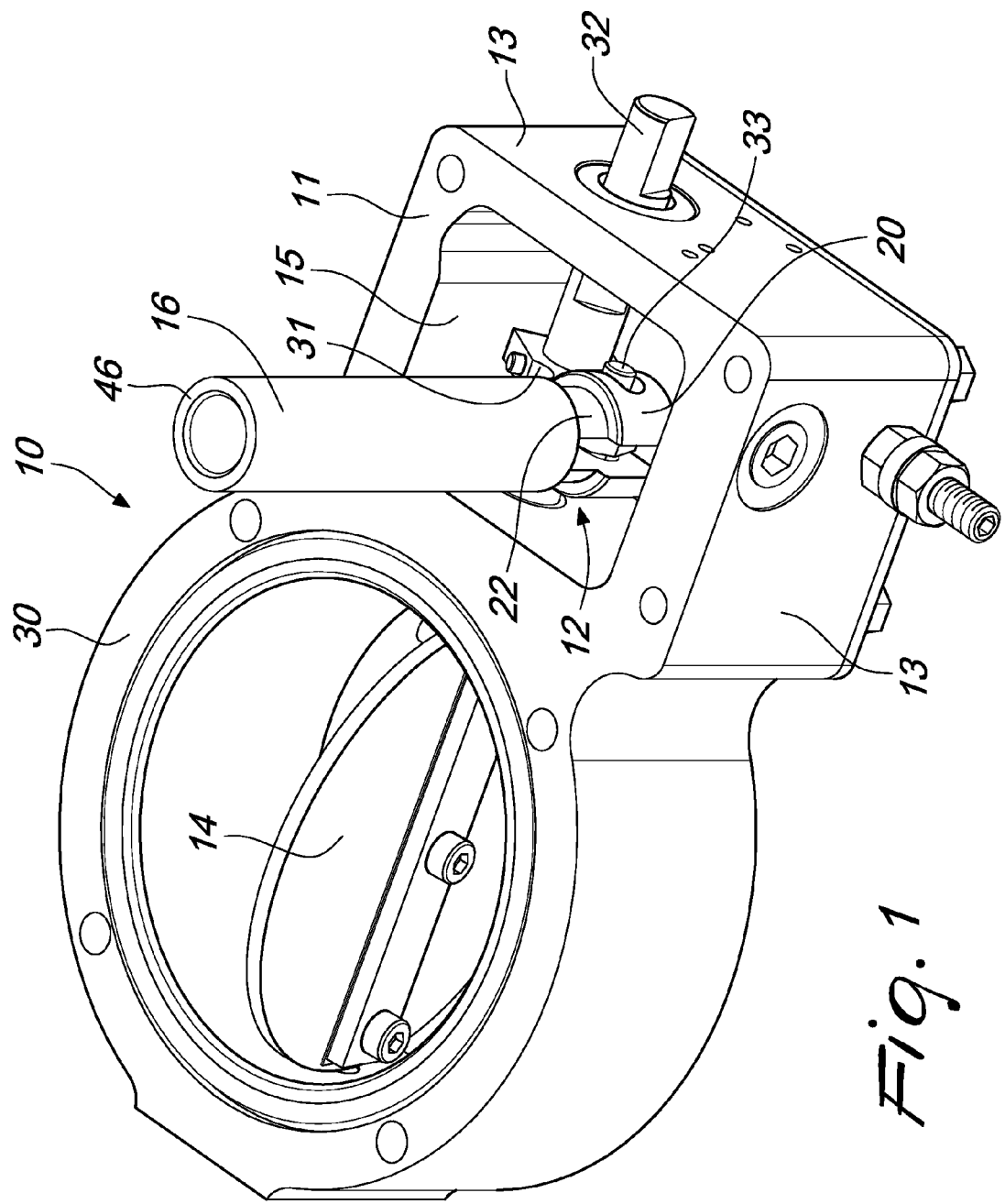
FIG. 1 is an isometric view of an armature assembly according to the present disclosure.

With reference to FIG. 1, the armature assembly 10 may comprise an armature bolt 12. Armature bolt 12 may be movably supported in the armature assembly 10. Armature bolt 12 may be movably supported in the armature assembly 10 so as to move in an axial direction. Armature bolt 12 may be axially movable along the longitudinal axis thereof. Armature bolt 12 may be axially translatable along the longitudinal axis thereof.

Armature bolt 12 may be movably supported in a frame 11. Armature bolt 12 may be movable relative to the frame 11. Armature bolt 12 may be axially movable along the longitudinal axis relative to the frame 11. Armature bolt 12 may be movable in an aperture bound by the frame 11. Frame 11 may have laterally enclosing sides 13 and may have an axial opening 15.

Armature bolt 12 may be movable between a first position and a second position. The first and second positions may be at opposite points of the travel path of the armature bolt 12. In an embodiment, the first and second positions may be at opposite terminal points of the travel path of the armature bolt 12. The travel path of the armature bolt 12 may be linear.

At the first position armature bolt 12 may be axially retreated relative to the axial opening 15 and at the second position the armature bolt 12 may be axially advanced relative to the axial opening 15.

The armature bolt 12 may be supported through a translation-rotation coupling. The translation-rotation coupling includes a hinged coupling 17. Movement of the armature bolt 12 may be transferred through the hinged coupling 17. Movement of the armature bolt 12 may effect a corresponding movement through the hinged coupling 17.

In an embodiment, armature bolt 12 may be resiliently supported. The hinged coupling 17 may include a resilient component.

The armature bolt 12 may be cylindrical and may have a longitudinal axis. Armature bolt 12 may comprise of a base portion 20 and a shank portion 22. The shank portion 22 may be rigidly coupled to the base portion 20. The shank portion 22 may be axially connected to the base portion 20. The shank portion 22 may be centrally disposed on the base portion 20.

Figure 2:
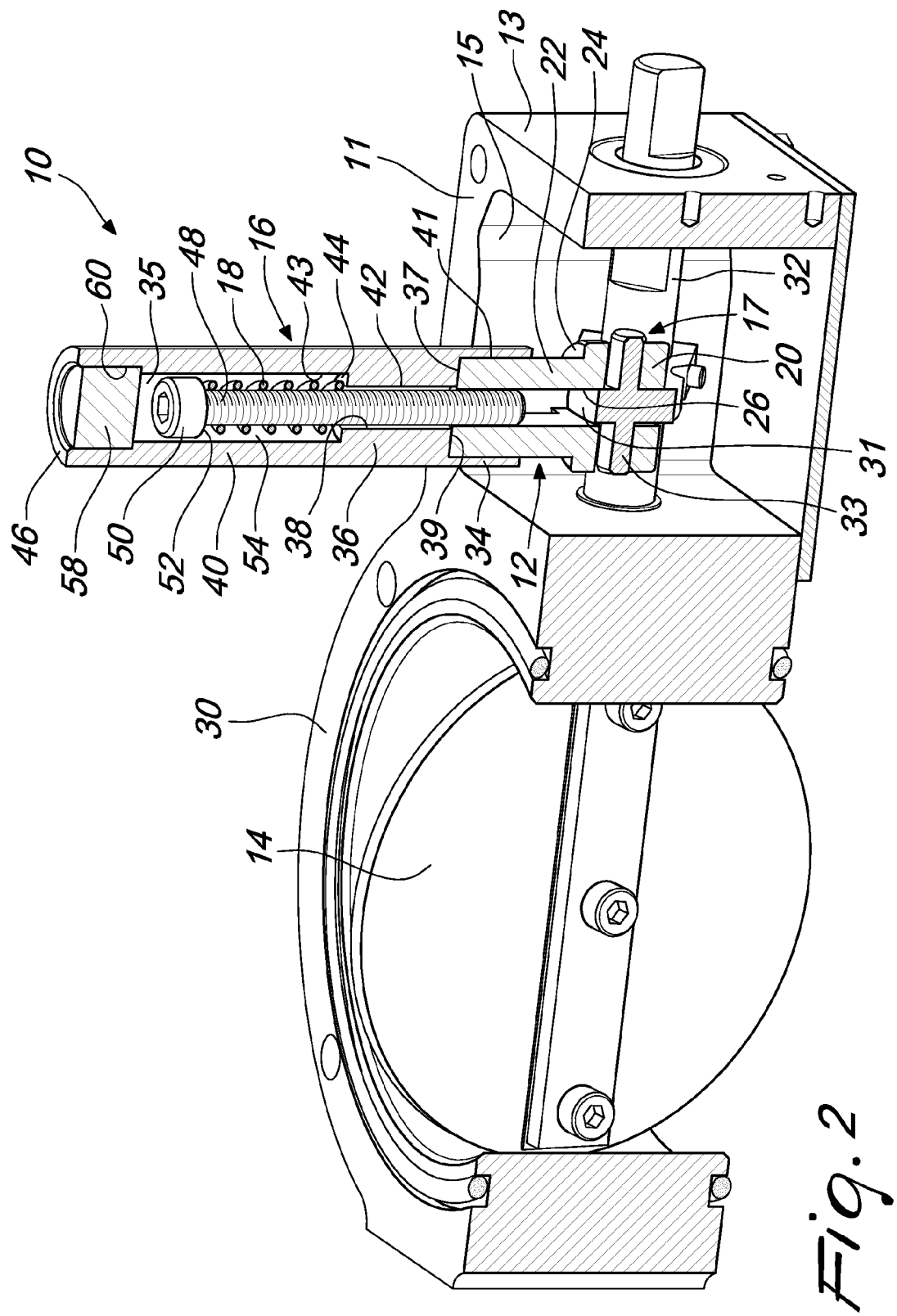
FIG. 2 is a sectional view of the armature assembly of FIG. 1.

With reference to FIG. 2, armature bolt 12 may have a central hole 26 extending in a direction parallel to the longitudinal axis of the armature bolt 12. The diameter of the central hole 26 may be unvaried along the armature bolt 12.

The shank portion 22 may have a smaller diameter relative to the base portion 20 to form a shoulder portion 24 between the proximal end of the shank portion 22 and the distal end of the base portion 20. The shoulder portion 24 may extend from the proximal end of the shank portion 22 towards the distal end of the base portion 20. The shoulder portion 24 may extend in a direction substantially perpendicular to the longitudinal axis of the armature bolt 12.

The distal end of the shank portion 22 may be a terminal end of the armature bolt 12. The opposite terminal end of the armature bolt 12 may be the proximal end of the base portion 20.

With reference to FIG. 1, armature bolt 12 may comprise a groove 28. Groove 28 may be formed as cut out from the armature bolt 12. Groove 28 may be machined into the armature bolt 12.

Groove 28 may extend from the external wall into the armature bolt 12 so as to form an opening along a side of the armature bolt 12. The interior of the groove 28 may be externally accessible. Groove 28 may extend from the external wall of the armature bolt 12 towards the longitudinal axis thereof in a direction that is normal to the longitudinal axis of the armature bolt 12.

In an embodiment, groove 28 may be inclined to the longitudinal axis of the armature bolt 12. Groove 28 may extend from the external wall of the armature bolt 12 towards the longitudinal axis thereof in a direction that is inclined to the longitudinal axis of the armature bolt 12.

With reference to FIG. 2, groove 28 may extend from a side of the armature bolt 12 to an opposite side thereof. Groove 28 may extend across the diameter of the armature bolt 12. Groove 28 may extend across the diameter of the armature bolt 12 in a direction substantially perpendicular to the longitudinal axis of the armature bolt 12. In an embodiment, the groove 28 may lie on a plane that intersects the longitudinal axis of the armature bolt 12.

Groove 28 may be in communication with the central hole 26.

Groove 28 may be disposed in the base portion 20. Groove 28 may be disposed between the shoulder portion 24 and the proximal end of the base portion 20. In an embodiment, a plane intersecting the groove 28 may be substantially parallel to the proximal end of the base portion 20. A plane intersecting the groove 28 may be substantially parallel to the shoulder portion 24.

With reference to FIG. 1, the armature assembly 10 may comprise a valve member 14. The valve member 14 may be movably disposed in the armature assembly 10 within a valve seat 30. The valve member 14 may be movable between an open and a closed position. At the open position the valve member 14 may permit flow of fluid and at the closed position valve member 14 may restrict flow of fluid.

The valve member 14 may be coupled to the armature bolt 12. The valve member 14 may be configured to close with the armature bolt 12 at the second position. The movement of the armature bolt 12 from the first position to the second position may effect a corresponding movement of the valve member 14 from the open to the close position. The movement of the armature bolt 12 from the second position to the first position may effect a corresponding movement of the valve member 14 from the close to the open position. Movement of the armature bolt 12 may effect a corresponding movement of the valve member through the hinged coupling 17.

In an embodiment, the valve member 14 may be a butterfly valve. The valve member 14 may be a rotationally supported disc.

The valve member 14 may be movably disposed within a valve seat 30. The valve seat 30 may be rigidly connected to the frame 11. The valve seat 30 may be laterally disposed in the armature assembly 10. Valve seat 30 may be laterally connected to the sides 13 of the frame 11.

The valve member 14 may be connected to the armature bolt 12 through the translation-rotation coupling such that the axial translation of the armature bolt 12 may effect a corresponding rotation of the valve member 14.

With reference to FIGS. 1 and 2, the translation-rotation coupling may comprise a connecting rod 32. The connecting rod 32 may be joined to the valve member 14 such that a rotation of the connecting rod 32 effects a corresponding rotation of the valve member 14. Connecting rod 32 may be joined to the edge of the valve member 14 such that the longitudinal axis of the connecting rod 32 may be parallel to the plane of the valve member 14. The valve member 14 may be rotated about the point of connection to the connecting rod 32.

The connecting rod 32 may extend from the connection with the valve member 14 through the valve seat 30 and the sides of the frame 11. The connecting rod 32 may be rotatably supported in the valve seat 30 and the sides 13 of the frame 11. The longitudinal axis of the connecting rod 32 may be parallel to the axial opening 15.

The translation-rotation coupling may comprise the hinged coupling 17. The connecting rod 32 may be connected to the armature bolt 12 through the hinged coupling 17. The hinged coupling 17 may comprise a lever 31 rigidly connected to the connecting rod 32. The lever 31 may be connected to the connecting rod 32 with a press fit pin. In an embodiment, the lever 31 may be movably connected to the connecting rod 32.

Lever 31 may extend in a direction perpendicular to the longitudinal axis of the connecting rod 32. Lever 31 may have a coupling end 33 that may engage in the groove 28 of the armature bolt 12. The coupling end 33 may be shaped and dimensioned to slidably engage in the groove 28.

The armature assembly 10 may comprise an armature body 16. Armature body 16 may be coupled to the armature bolt 12. Armature body 16 may be movably supported relative to the armature bolt 12. Armature body 16 may be slidably coupled to the armature bolt 12. Armature body 16 may be axially slidable relative to the armature bolt 12. Armature body 16 may be axially slidable in a direction parallel to the longitudinal axis of the armature bolt 12.

Armature body 16 may be movable relative to the frame 11. Armature body 16 may be movable relative to the frame 11 when the armature bolt 12 moves between the first and second position.

Armature body 16 may be coupled to the shank portion 22 of the armature bolt 12. Armature body 16 may be coupled to the distal part of the shank portion 22. Armature body 16 may be slidably coupled to the shank portion 22.

With reference to FIG. 2, armature body 16 may be formed as a tubular sleeve enclosing a bore 35. Bore 35 may vary in diameter along the length of the armature body 16. The outer diameter of the armature body 16 may remain unvaried along the length thereof. Bore 35 may be divided into first, second and third bore sections 41, 42 and 43.

Armature body 16 may have a sliding portion 34. Sliding portion 34 may be disposed at the proximal end of the armature body 16. Sliding portion 34 may be slidable on the outer wall of the shank portion 22. Sliding portion 34 may comprise the first bore section 41. The internal wall of the shank portion 22 may enclose the first bore section 41.

Diameter of the first bore section 41 may be greater than the diameter of the shank portion 22 of the armature bolt 12. Diameter of the internal wall of the sliding portion 34 may be greater than the diameter of the external wall of the shank portion 22.

In an embodiment, sliding portion 34 may be slidable in the central hole 26 along the internal wall of the shank portion 22. Diameter of the first bore section 41 may be smaller than the diameter of the central hole 26. Diameter of the external wall of the sliding portion 34 may be smaller than the diameter of the internal wall of the shank portion 22.

In an embodiment, sliding portion 34 may be slidable in recesses provided in the shank portion 22. The shank portion 22 may have slots within which the sliding portion 34 may be configured to be slidably mated.

Armature body 16 may have an abutment portion 36 joined to the sliding portion 34. The abutment portion 36 may be joined axially to the distal end of the sliding portion 34. The abutment portion 36 may comprise the second bore section 42.

The abutment portion 36 may have an abutment element 38. Abutment element 38 may abut the distal terminal end 39 of the armature bolt 12. The abutment element 38 may have an abutment surface 37 to abut the distal terminal end 39 of the armature bolt 12. Abutment surface 37 may extend from the proximal end of the abutment element 38 to the distal end of the sliding portion 34 in a direction perpendicular to the longitudinal axis of the armature bolt 12.

Abutment element 38 may restrict the movement of the armature body 16. The point of engagement of the abutment element 38 and the distal terminal end of the armature bolt 12 may be an end point of the travel path of the armature body 16.

Abutment element 38 may be a projection from the abutment portion 36. Abutment element 38 may project into the second bore section 42. Abutment element 38 may project substantially perpendicular to the internal wall of the abutment portion 36. Abutment element 38 may project substantially perpendicular to the longitudinal axis of the armature body 16. Diameter of the second bore section 42 may be substantially equal to the diameter of the central hole 26 of the armature bolt 12.

Abutment element 38 may extend axially parallel to the longitudinal axis of the armature body 16. Abutment element 38 may extend axially along the abutment portion 36 parallel to the external wall thereof. Abutment element 38 may extend axially along the entire abutment portion 36.

In an embodiment, abutment element 38 may be annular. Abutment element 38 may extend laterally so that the internal wall thereof encircles the second bore section 42. Abutment element 38 may extend laterally on the abutment portion 36. Abutment element 38 may be concentric with the abutment portion 36. In an embodiment, the abutment element 38 may be provided with mutually spaced notches.

Armature body 16 may have a seal portion 40 joined to the abutment portion 36. The seal portion 40 may be joined axially to the distal end of the abutment portion 36. The seal portion 40 may comprise a third bore section 43. Diameter of the third bore section 43 may be greater than the second bore section 42.

The abutment element 38 may have a limit surface 44 opposite the abutment surface 37. The limit surface 44 may face the third bore section 43. Limit surface 44 may extend from the distal end of the abutment element 38 to the proximal end of the seal portion 40. Limit surface 44 may extend in a direction substantially perpendicular to the longitudinal axis of the armature body 16. Limit surface 44 may bound an end of the third bore section 43. The seal portion 40 may have a seal surface 46 at the distal end of the armature body 16. The seal surface 46 may be disposed axially from the limit surface 44. Seal surface 46 may be annular and formed between the edges of the internal and external walls of the seal portion 40. The third bore section 43 may terminate at the seal surface 46.

Armature body 16 may be formed from magnetic or ferromagnetic material.

With reference to FIGS. 1 and 2, the armature assembly 10 may comprise a guide 48. Guide 48 may be connected to the armature bolt 12. Guide 48 may be connected to the shank portion 22. Guide 48 may be inserted into the central hole 26 of the shank portion 22. Guide 48 may extend from the central hole 26 in a direction away from the base portion 20. Guide 48 may be a rod-like member. Central hole 26 may be adapted to receive the guide 48.

Guide 48 may have a limit element 50. The limit element 50 may be disposed at an end of the guide 48 opposite the end coupled to the shank portion 22. Limit element 50 may extend in a direction perpendicular to the longitudinal axis of the guide 48 so as to form a shoulder 52. Limit element 50 may be annular and may have a diameter greater than the perimeter of the guide 48. The shoulder 52 may be annular and may extend radially from the guide 48. Shoulder 52 may face the limit surface 44 of the abutment element 38.

Shoulder 52 may be spaced from the limit surface 44 so as to form a gap 54. Gap 54 may be limited by the guide 48, internal wall of the third bore section 43, shoulder 52 and limit surface 44.

In an embodiment, the guide 48 may be a screw. Limit element 50 may be the head of the screw.

Guide 48 may be coupled to the armature body 16. Armature body 16 may be movably coupled to the guide 48. Armature body 16 may be axially movable along the guide 48. Armature body 16 may be axially slidable along the guide 48. The abutment element 38 may be axially slidable along the guide 48.

Limit element 50 may be supported so as to be movable in the third bore section 43 of the armature body 16. Limit element 50 may have a dimension that is smaller than the diameter of the third bore section 43. Armature body 16 may move axially along guide 48 between the distal terminal end 39 of the armature bolt 12 and the limit surface 44.

With reference to FIGS. 1 and 2, the armature assembly 10 may comprise a resilient member 18. Resilient member 18 may provide an axial force along the longitudinal axis of the armature body 16. Resilient member 18 may provide an axial force that acts on the limit element 50 and the abutment element 38.

The resilient member 18 may be positioned between the limit element 50 of guide 48 and the abutment element 38 of armature body 16. Resilient member 18 may be disposed in the gap 54. The limit element 50 and the abutment element 38 may compress the resilient member 18 when the armature body 16 is moved in a direction away from the armature bolt 12. The limit element 50 and the abutment element 38 may compress the resilient member 18 when the armature body 16 is moved in an axial direction away from the armature bolt 12. The resilient member 18 may be compressed between the limit element 50 and the abutment element 38 with the armature bolt 12 at the second position.

The resilient member 18 may be disposed in the gap 54 between the shoulder 52 and the limit surface 44. The shoulder 52 and the abutment element 38 may compress the resilient limit surface 44 with the armature bolt 12 at the second position.

Compression of the resilient member 18 may effect a biasing force on the armature bolt 12 and the armature body 16. The armature bolt 12 may be held at the second position by the biasing force of the resilient member 18.

The resilient member 18 may be axially disposed between the guide 48 and the armature body 16. Resilient member 18 may be axially disposed between the limit element 50 and the armature body 16. Resilient member 18 may be axially disposed between the shoulder 52 and the limit surface 44.

The resilient member 18 may retain the valve member 14 in the closed position with the armature bolt 12 at the second position. Movement of the armature body 16 away from the armature bolt 12 may compress the resilient member 18 so as to impart an axial pulling force on the armature bolt 12. The axial pulling force may hold the armature bolt 12 at the second position so as to retain the valve member 14 in the closed position.

The resilient member 18 may not hold the valve member 14 in the closed position with the armature bolt 12 no longer at the second position. Movement of the armature body 16 towards the armature bolt 12 may allow extension of the resilient member 18 so that the axial pulling force on the armature bolt 12 is removed. The valve member 14 may move from the closed position to the open position when the axial pulling force on the armature bolt 12 is removed.

In an embodiment, resilient member 18 may be a spring such as a coil spring. The terminal ends of the spring may be in engagement with the shoulder 52 and the limit surface 44. The spring may be coiled around the guide 48. Movement of the armature body 16 away from the armature bolt 12 may compress the spring so as to impart an axial pulling force on the armature bolt 12.

With reference to FIGS. 1 and 2, the armature assembly 10 may comprise a plug 58. Plug 58 may be disposed at a distal end of the armature body 16. Plug 58 may be disposed at an end of the armature body 16 opposite the armature bolt 12. Plug 58 may be inserted into the armature body 16. Plug 58 may be form fitted into the armature bolt 12.

Plug 58 may be composed of magnetic or ferromagnetic material. Plug 58 may complete the magnetic circuit through the armature body 16.

Plug 58 may be inserted into an indentation 60 formed in the internal wall of the seal portion 40. Plug 58 may be form fitted into the indentation 60. Plug 58 may be held in the third bore section 43 at the indentation 60. Plug 58 may be disposed below the seal surface 46 so that an opening is formed between a distal surface of the plug 58 and the seal surface 46.

In an embodiment, the plug 58 may be disposed at the seal surface such that the distal surface of the plug 58 may be planar with the seal surface 46.

In an embodiment, the armature assembly 10 may comprise a resilient member provided as lever 31 that couples the armature bolt 12 to the valve member 14. The resilient member may be composed of a plastic material. In an embodiment, the armature body 16 may be fastened to the armature bolt 12. The armature body 16 may be rigidly fastened to the armature bolt 12.

Figure 3:
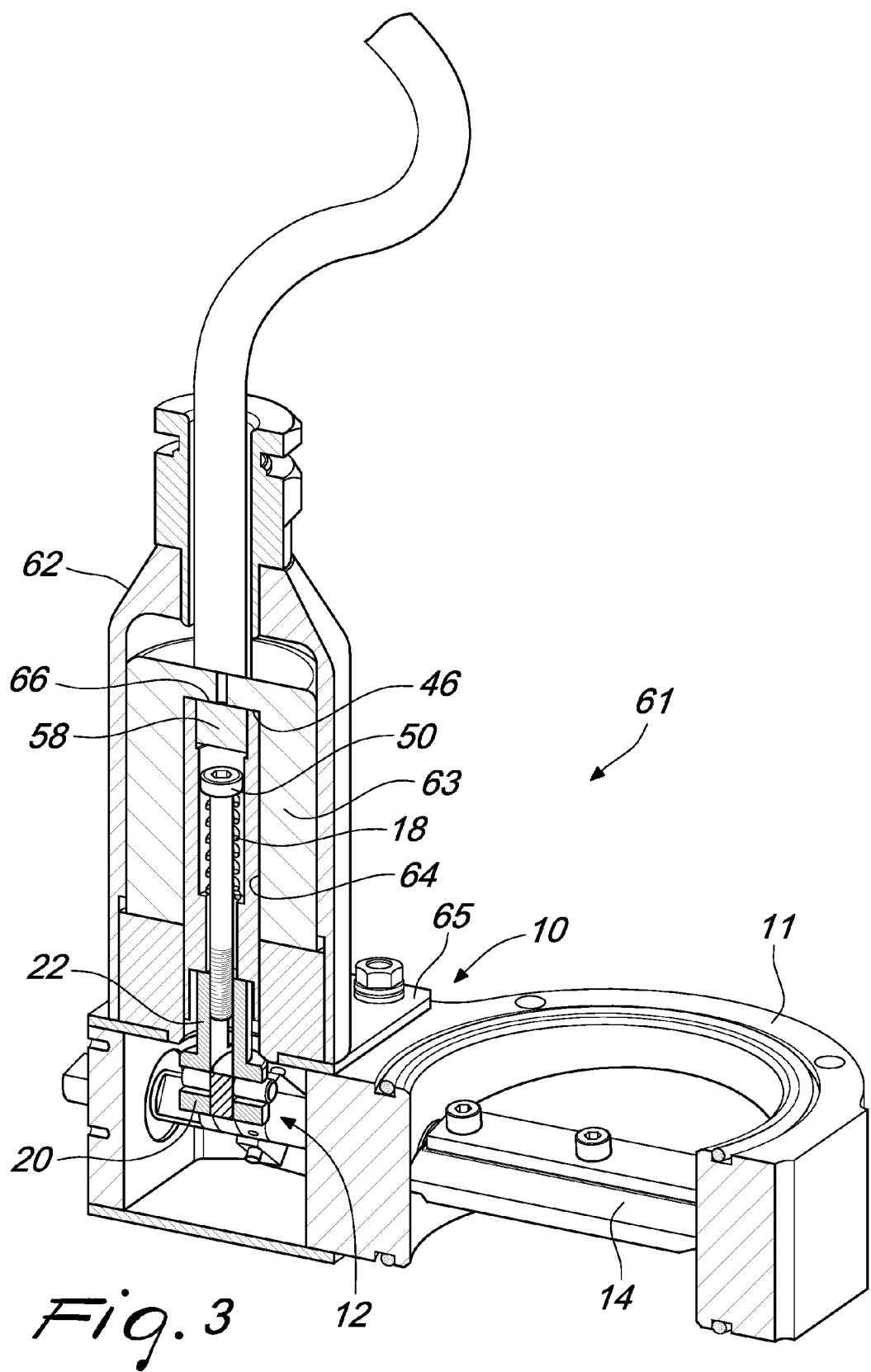
FIG. 3 is an isometric view of the armature assembly of FIG. 1 assembled with a solenoid.
Figure 4:
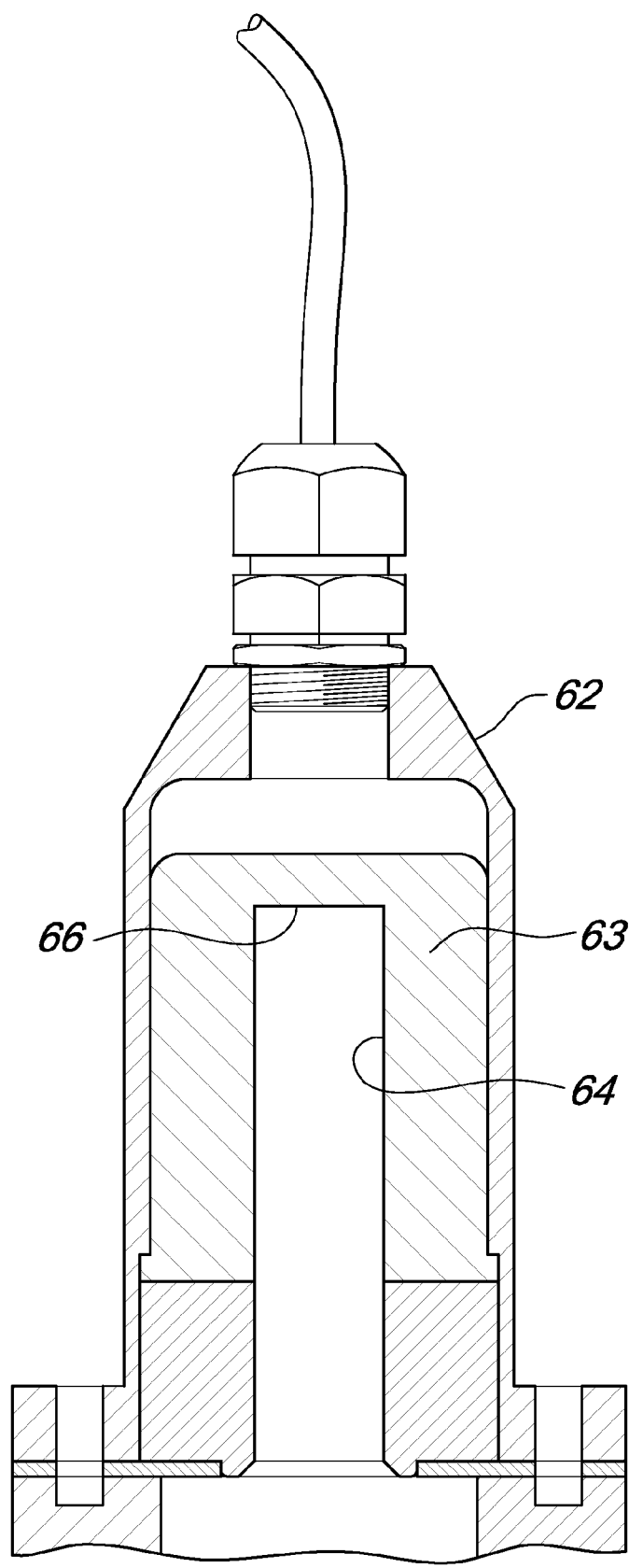
FIG. 4 is a sectional view of the solenoid of FIG. 3.

With reference to FIGS. 3 and 4, armature assembly 10 may be assembled with a solenoid 62 to form a solenoid valve 61. Armature assembly 10 may be assembled to the solenoid through a mounting plate 65. The solenoid 62 may comprise a channel 64 for receiving the armature bolt 12. Channel 64 may receive the armature body 16.

Solenoid 62 may comprise a coil assembly 63. Coil assembly 63 may comprise high current pull coils and low current hold coils. The high current pull coils and the low current hold coils may be separated. In an embodiment, high current coil may overlap with the low current coils. High current coil may have low resistance and low current coil may have high resistance.

The high current coils may slidably actuate the armature body 16 within the channel 64. Armature body 16 may be actuated within the channel 64 such that the armature body 16 may axially move away from the armature bolt 12 towards a contact surface 66 thereby compressing the resilient member 18. The high current coil may pull the armature body 16 into the channel 64.

In an embodiment, the contact surface 66 may be the channel end. The armature body 16 may reach the end of the travel path when the seal surface 46 contacts the contact surface 66.

Actuation of the armature body 16 within the channel 64 may transmit a closing force to the valve member 14. As the armature body 16 travels towards the contact surface 66, armature bolt 12 may be moved from the first position to the second position through the axial force imparted by the resilient member 18. The axial force may be transmitted to the valve member 14. The axial force may be a closing force that moves the valve member 14 from the open position to the closed position. At the end of the travel path of the armature body 16 the valve member 14 may be in the closed position.

The low current coils may hold the armature body 16 in abutment with a contact surface 66 in the channel 64. The seal surface 46 may remain in contact surface 66. The armature bolt 12 may be held at the second position thereby retaining the valve member 14 in the closed position.

When the low current coils are deactivated the holding force on the armature body 16 may not be present thus allowing the armature body 16 to be pulled away from the contact surface 66 by the axial force imparted by the resilient member 18. The movement of the armature body 16 towards the armature bolt 12 may allow the armature bolt 12 to move from the second position to the first position thereby allowing the valve member 14 to move from the closed position to the open position.

In an embodiment, the coil assembly 63 may comprise a Single Coil Controlled by PWM (Pulse Width Modulation). The coil may be provided with a high power (e.g. 100%) to pull the armature body into the channel 64 and subsequently switched to a lower power (e.g. 10%) to hold the valve member 14 in the closed position.

In an embodiment, the coil assembly 63 may be Single coil Voltage Controlled. The coil may be provided with a high voltage to pull the armature body into the channel 64 and subsequently switched to a lower voltage to hold the valve member 14 in the closed position.

The skilled person would appreciate that foregoing embodiments may be modified or combined to obtain the armature assembly 10 of the present disclosure.

INDUSTRIAL APPLICABILITY

This disclosure describes an armature assembly 10 for a solenoid valve 61. The armature assembly 10 may be assembled with a solenoid 62 to form a solenoid valve 61. The armature assembly 10 may be assembled with the solenoid 62 for use as a modular air shut off valve that can be configured in a variety of different manners with multiple different actuating devices. The armature assembly 10 may be provided in an engine air valve to control engine overspeed by preventing overheating through the stoppage of air flow.

The valve member 14 of the armature assembly 10 may be normally open and a potential problem may be to maintain an air seal in the closed position of the valve member 14. To generate movement of the armature, comprised of the armature body 16 and the armature bolt 12, an initial high current may be used to draw the armature bolt 12 and the armature body 16 into the solenoid. The high current may be turned off and a lower hold power current may be used to retain the armature assembly 10 in the solenoid and to retain the valve in the closed position.

An armature may not fully engage a solenoid so as to effect a metal to metal contact between the armature and the solenoid. The armature may not fully engage the solenoid, for example as a result of machining tolerance. Without the contact, the lower hold current may not be able to retain the armature in the solenoid and to retain a valve in the closed position.

The armature assembly 10 may provide for a metal to metal seal between the armature in the solenoid 62 despite gaps formed as a result of machining tolerance. When the initial high current is energised, magnetic force of the solenoid 62 may move the armature assembly 10 into a final position. If end of the armature assembly 10 may not be in full contact with the inside of the solenoid 62, the resilient member 18 or the resilient lever 31 may yield to permit the armature assembly 10 to contact the solenoid 62 so as to establish a metal to metal contact between the armature assembly 10 and the solenoid 62. The initial high current can be reduced to a lower hold current when the metal to metal contact is established.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. An armature assembly for a solenoid valve, the armature assembly comprising:
   a moveably supported armature bolt, the armature bolt being movable between a first position and a second position;
   a valve member coupled to the armature bolt, the valve member being configured to close with the armature bolt at the second position;
   an armature body having a uniform cylindrical outer surface that is adapted to slidably engage a channel of a solenoid, the armature body forming an end bore that slidably engages the armature bolt directly; and
   a guide fixedly engaged with the armature bolt and disposed entirely within a central bore formed in the armature body, the central bore and end bore being aligned along a centerline of the armature body, the guide forming a shoulder extending radially from the guide and disposed at a gap from a limit surface of the armature body within the central bore; and
   a resilient member disposed within the central bore and extending along the guide between the shoulder and the limit surface of the armature body, the resilient member being in a compressed state to retain the valve member in the closed position by providing a biasing force when the armature bolt is disposed at the second position.

2. A solenoid valve comprising:
   an armature assembly according to claim 1; and
   a solenoid comprising:
      a channel for receiving the armature bolt and the armature body;
      high power coils to slidably actuate the armature body within the channel so as to transmit a closing force to the valve member; and
      low power coils to hold the armature body in abutment with a contact surface in the channel so as to hold the valve member in the closed position.

3. The armature assembly according to claim 1 wherein the armature body is tubular sleeve.

4. The armature assembly according to claim 3 wherein a plug is disposed at an end of the armature body opposite the armature bolt such that the plug closes an open end of the bore formed in the armature body to enclose the guide.

5. The armature assembly according to claim 1 wherein the resilient member is a lever coupling the armature bolt to the valve member.

6. The armature assembly according to claim 5 wherein armature bolt comprises a groove to accommodate the lever.

7. The armature assembly according to claim 1 wherein the resilient member is composed of a plastic material.

8. The armature assembly according to claim 5 wherein the armature body is fastened to the armature bolt.

9. The armature assembly according to claim 7 wherein the armature body is fastened to the armature bolt.

10. The armature assembly according to claim 1 wherein the armature bolt is coupled to the valve member through a translation-rotation coupling.

11. The armature assembly according to claim 10 wherein the translation-rotation coupling comprises a connecting rod joined to the edge of the valve member.

12. The armature assembly according to claim 11 wherein the connecting rod is connected to the armature bolt through a hinged coupling having a lever.

13. The armature assembly according to claim 12 wherein armature bolt comprises a groove to accommodate the lever.

14. The armature assembly according to claim 1 wherein the armature body is movably supported relative to the armature bolt.

15. The armature assembly according to claim 14 wherein the armature body is a tubular sleeve.

16. The armature assembly according to claim 15 wherein a plug is disposed at an end of the armature body opposite the armature bolt.

17. The armature assembly according to claim 16 wherein the armature bolt is coupled to the valve member through a translation-rotation coupling.

* * * * *